United States Patent
Han et al.

(10) Patent No.: US 9,773,338 B2
(45) Date of Patent: Sep. 26, 2017

(54) RENDERING METHOD OF 3D WEB-PAGE AND TERMINAL USING THE SAME

(75) Inventors: Soonbo Han, Seoul (KR); Hyungseok Jang, Seoul (KR); Sangjo Park, Gunpo-Si (KR); Dongyoung Lee, Anyang-Si (KR); Donghyun Kang, Seoul (KR); Hyojin Song, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/406,342

(22) PCT Filed: Jun. 8, 2012

(86) PCT No.: PCT/KR2012/004544
§ 371 (c)(1),
(2), (4) Date: Dec. 8, 2014

(87) PCT Pub. No.: WO2013/183801
PCT Pub. Date: Dec. 12, 2013

(65) Prior Publication Data
US 2015/0170397 A1 Jun. 18, 2015

(51) Int. Cl.
*G06T 15/00* (2011.01)
*H04N 13/02* (2006.01)
(Continued)

(52) U.S. Cl.
CPC ........ *G06T 15/005* (2013.01); *G06F 17/2247* (2013.01); *H04N 13/0022* (2013.01); *H04N 13/0275* (2013.01)

(58) Field of Classification Search
CPC ......... G06T 2207/10028; G06T 19/006; G06T 2200/04; G06T 7/0051; G06T 19/20; G06T 3/40
See application file for complete search history.

(56) References Cited

U.S. PATENT DOCUMENTS

| | | | |
|---|---|---|---|
| 6,734,873 B1 * | 5/2004 | Herf | G06T 15/40 345/538 |
| 2003/0077002 A1 * | 4/2003 | Silverstein | H04N 21/2662 382/282 |

(Continued)

FOREIGN PATENT DOCUMENTS

CN 101331473 12/2008

OTHER PUBLICATIONS

PCT International Application No. PCT/KR2012/004544, Written Opinion of the International Searching Authority dated Feb. 1, 2013, 1 page.

(Continued)

*Primary Examiner* — Barry Drennan
*Assistant Examiner* — Jason Pringle-Parker
(74) *Attorney, Agent, or Firm* — Lee, Hong, Degerman, Kang & Waimey

(57) ABSTRACT

Disclosed are a rendering method of a 3D web-page and a terminal using the same. The rendering method includes loading a source text including depth information on one or more 3D objects constituting the 3D web-page, creating a document object model (DOM) tree and style rules including the depth information by parsing the source text, generating a render tree based on the DOM tree and the style rules, performing a layout on the render tree, painting left-eye and right-eye pages by applying, to the result obtained by performing the layout, a 3D factor including one or more the position, size, disparity, shape and arrangement of the 3D object, and merging the left-eye and right-eye pages and displaying the merged left-eye and right-eye pages on the 3D browser.

16 Claims, 8 Drawing Sheets

(51) Int. Cl.
G06F 17/22 (2006.01)
H04N 13/00 (2006.01)

(56) References Cited

U.S. PATENT DOCUMENTS

| | | | |
|---|---|---|---|
| 2006/0005114 A1 | 1/2006 | Williamson et al. | |
| 2007/0130525 A1* | 6/2007 | Murphy | G06F 17/30905 715/747 |
| 2010/0064209 A1 | 3/2010 | Wielgosz et al. | |
| 2011/0032330 A1 | 2/2011 | Kim et al. | |
| 2011/0050687 A1* | 3/2011 | Alyshev | G06F 9/4443 345/419 |
| 2011/0064383 A1 | 3/2011 | Bauchot et al. | |
| 2011/0161843 A1* | 6/2011 | Bennett | G06F 3/14 715/760 |
| 2011/0316984 A1* | 12/2011 | Akeley | H04N 13/0022 348/51 |
| 2013/0120401 A1* | 5/2013 | Borysenko | G06T 13/80 345/473 |

OTHER PUBLICATIONS

The State Intellectual Property Office of the People's Republic of China Application Serial No. 201280073777X, Office Action dated May 18, 2016, 9 pages.
Behr, et al., "X3DOM—A DOM-Based HTML5/ X3D Integration Model," 14th International Conference on 3D Web Technology, XP55243154, Jun. 2009, 12 pages.
European Patent Office Application Serial No. 12878335.4, Search Report dated Feb. 2, 2016, 9 pages.

* cited by examiner

FIG. 5
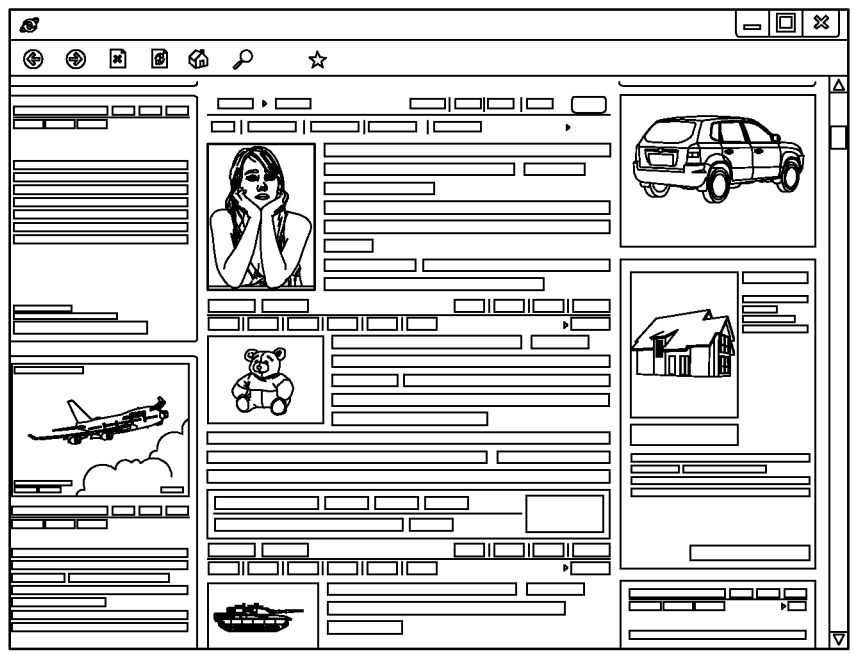
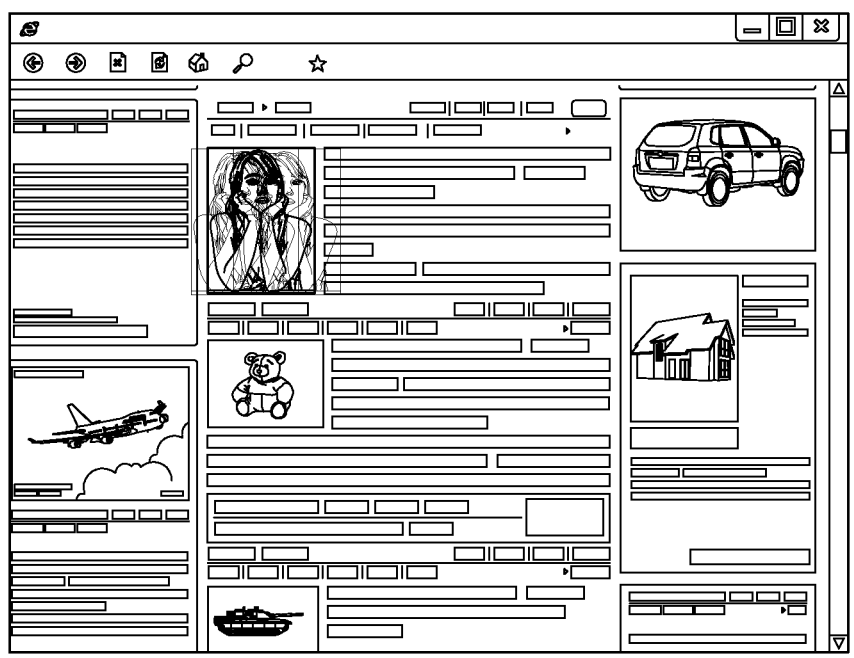

FIG. 7
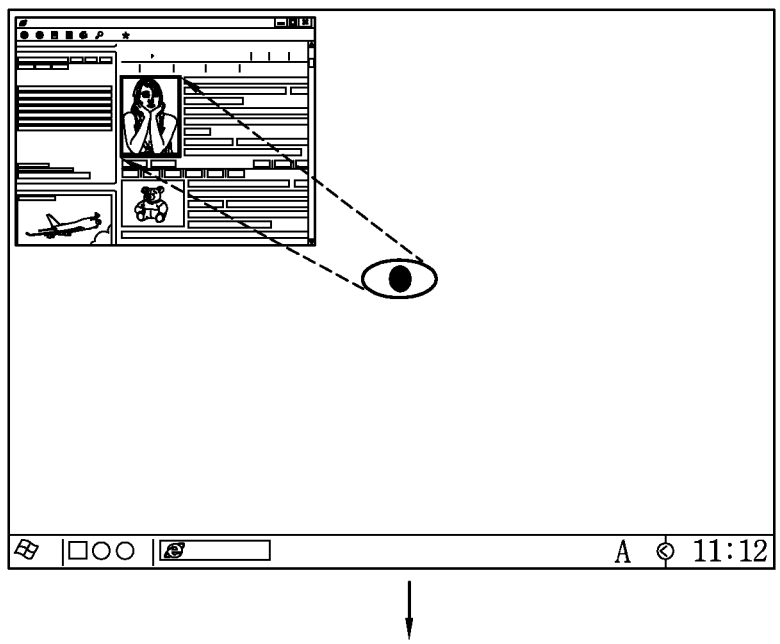
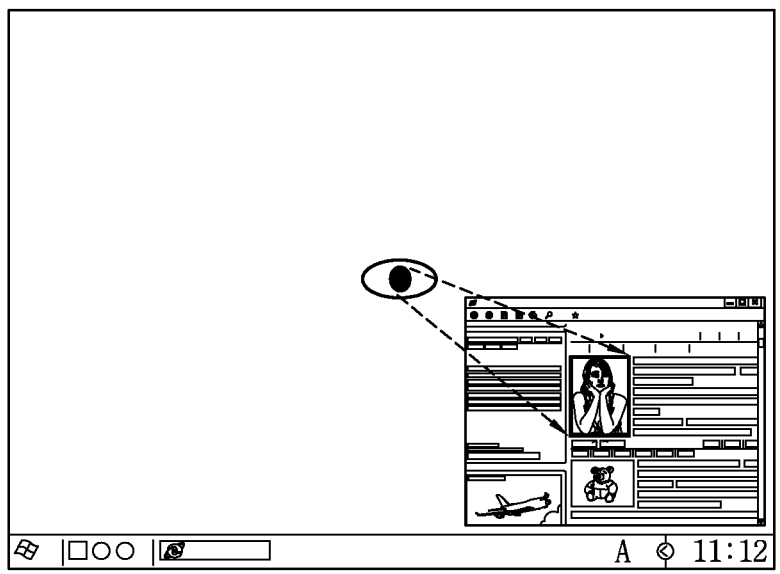

RENDERING METHOD OF 3D WEB-PAGE AND TERMINAL USING THE SAME

CROSS-REFERENCE TO RELATED APPLICATIONS

This application is the National Stage filing under 35 U.S.C. 371 of International Application No. PCT/KR2012/004544, filed on Jun. 8, 2012, the contents of which are hereby incorporated by reference herein in their entirety.

TECHNICAL FIELD

The present disclosure relates to a rendering method of a 3D web-page and a terminal using the same.

BACKGROUND ART

Internet technology provides Internet application developers with combination of declarative and programming elements used to develop applications. The Internet application developers use programming elements such as JavaScript for providing computational and interactive behaviors based on declarative elements and documents such as a hyper-text markup language (HTML) and cascading style sheets (CSS) that provide structures, contents and decorations in the documents.

The Internet technology has provided a browser with browser-deployable and responsive applications.

However, since the HTML based on images and texts is used on a browser, the Internet technology mainly provides 2D image and text services.

With the development of a technology for providing 3D stereoscopic images, attempts to display 3D images on an Internet browser using a plug-in technique such as Active-X have recently been made.

However, the Internet technology is currently remained in the state in which a 2D image is three-dimensionally displayed by simply using a perspective view, etc. In addition, the Internet technology does not provide a substantial 3D image to which an anaglyph scheme is applied in a 3D TV, etc.

DISCLOSURE OF INVENTION

Technical Problem

Therefore, an object of the present disclosure is to provide a rendering method of a 3D web-page and a terminal using the same for rendering a 3D object by incorporating depth information in a source text for a 3D web-page.

Therefore, another object of the present disclosure is to provide a rendering method of a 3D web-page and a terminal using the same for stereoscopically displaying a 3D object on a 3D browser according to a change in the depth of the 3D object, a scrolling operation, a change in the position of a browser window, etc.

Solution to Problem

To achieve these and other advantages and in accordance with the purpose of the present invention, as embodied and broadly described herein, there is provided a rendering method of a 3D web-page, including: loading a source text including depth information on one or more 3D objects constituting the 3D web-page; creating a document object model (DOM) tree and style rules including the depth information by parsing the source text; generating a render tree based on the DOM tree and the style rules; performing a layout on the render tree; painting left-eye and right-eye pages by applying, to the result obtained by performing the layout, a 3D factor including one or more the position, size, disparity, shape and arrangement of the 3D object; and merging the left-eye and right-eye pages and displaying the merged left-eye and right-eye pages on the 3D browser.

The performing of the layout may include forming one or more layers by incorporating 3D objects having the same depth information among the one or more 3D objects in the same layer, and determining a painting order by arraying the one or more layers based on the depth information.

The determining of the painting order includes determining the painting order based on a z-index or order indicated in the source text with respect to the 3D objects having the same depth information, which are included in the same layer.

The performing of the layout may include computing the 3D factor so as to paint the 3D objects based on the depth information; and storing the 3D factor.

The painting of the left-eye and right-eye pages may include computing the 3D factor based on the depth information, and painting the left-eye and right-eye pages by applying the computed 3D factor.

The 3D factor may be computed so that the size of the 3D object is larger than the original size of the 3D object in proportion to a positive increase in the depth information on the 3D object, and the 3D factor may be computed so that the size of the 3D object is smaller than the original size of the 3D object in proportion to a negative increase in the depth information on the 3D object.

The 3D factor may be computed based on the position of the 3D object on the 3D browser.

The 3D factor may be computed so that the size of the 3D object is larger than a value in proportion to the depth information as the 3D object is close to a specific position of the 3D browser, and the 3D factor may be computed so that the size of the 3D object is smaller than a value in proportion to the depth information as the 3D object is distant from the specific position of the 3D browser.

When the 3D factor is positioned in an arbitrary direction with respect to the specific position of the 3D browser, the 3D factor may be computed by further moving the position of the 3D object by an arbitrary distance in the arbitrary direction.

The specific position may be a center of the 3D browser.

The 3D factor may be computed based on the position of the 3D browser on a display unit on which the 3D browser is displayed.

The displaying of the left-eye and right-eye pages may include displaying the 3D web-page using one of a side-by-side scheme, a top-and-bottom scheme and a line-by-line scheme.

The rendering method may further include determining whether or not the 3D object moves, and performing the layout by re-computing the 3D factor based on a new position of the 3D object on the 3D browser, when the 3D object moves.

To achieve the above aspect of the present disclosure, there is provided a terminal, including: a control unit configured to render a 3D web-page; and a display unit configured to display the rendered 3D web-page, wherein the control unit loads a source text including depth information on one or more 3D objects constituting the 3D web-page, creates a DOM tree and style rules including the depth information by parsing the source text, generates a render tree based on the DOM tree and the style rules, performs layout on the render tree, paints left-eye and right-eye pages by applying, to the result obtained by performing the layout, a 3D factor including one or more of the position, size, disparity, shape and arrangement of the 3D object, and controls the display unit to merge the left-eye and right-eye pages and display the merged left-eye and right-eye pages on a 3D browser.

The control unit may form one or more layers by incorporating 3D objects having the same depth information among the one or more 3D objects in the same layer, and determine a painting order by arraying the one or more layers based on the depth information.

The control unit may determine the painting order based on a z-index or order indicated in the source text with respect to the 3D objects having the same depth information, which are included in the same layer.

The terminal may further include a storage unit configured to store the 3D factor. In the terminal, the control unit may compute the 3D factor so as to paint the 3D object based on the depth information, and control the storage unit to store the 3D factor.

The control unit may compute the 3D factor based on the depth information, and paints the left-eye and right-eye pages by applying the computed 3D factor.

The control unit may compute the 3D factor so that the size of the 3D object is larger than the original size of the 3D object in proportion to a positive increase in the depth information on the 3D object, and the control unit may compute the 3D factor so that the size of the 3D object is smaller than the original size of the 3D object in proportion to a negative increase in the depth information on the 3D object.

The control unit may compute the 3D factor for the 3D object based on the position of the 3D object on the 3D browser.

The control unit may compute the 3D factor so that the size of the 3D object is larger than a value in proportion to the depth information as the 3D object is close to a specific position of the 3D browser, and the control unit may compute the 3D factor so that the size of the 3D object is smaller than a value in proportion to the depth information as the 3D object is distant from the specific position of the 3D browser.

When the 3D factor is positioned in an arbitrary direction with respect to the specific position of the 3D browser, the control unit may compute the 3D factor by further moving the position of the 3D object by an arbitrary distance in the arbitrary direction.

The specific position may be a center of the 3D web-browser.

The control unit the control unit computes the 3D factor for the 3D object based on the position of the 3D browser on the display unit.

The display unit may display the 3D web-page using one of a side-by-side scheme, a top-and-bottom scheme and a line-by-line scheme.

The control unit may determine whether or not the 3D object moves, and perform the layout by re-computing the 3D factor based on a new position of the 3D object on the 3D browser, when the 3D object moves.

Advantageous Effects of Invention

According to the method of rendering a 3D web-page and the terminal using the same of the present disclosure, a 3D object can be stereoscopically display together with a 2D image on a 3D browser by rendering the 3D browser using a HTML/CSS source including depth information on the 3D object.

Further, according to the method of rendering a 3D web-page and the terminal using the same of the present disclosure, a 3D object can be more realistically displayed by rendering a 3D browser in consideration of a change in the depth of the 3D object, a scrolling operation of the 3D browser and a change in the position of a browser window according to the use of the Internet.

BRIEF DESCRIPTION OF DRAWINGS

FIG. 5 is a view illustrating a result displayed on a 3D web-page according to a first embodiment of the present disclosure;

FIG. 7 is a view illustrating a result displayed on a 3D web-page according to a third embodiment of the present disclosure.

MODE FOR THE INVENTION

Figure 1:
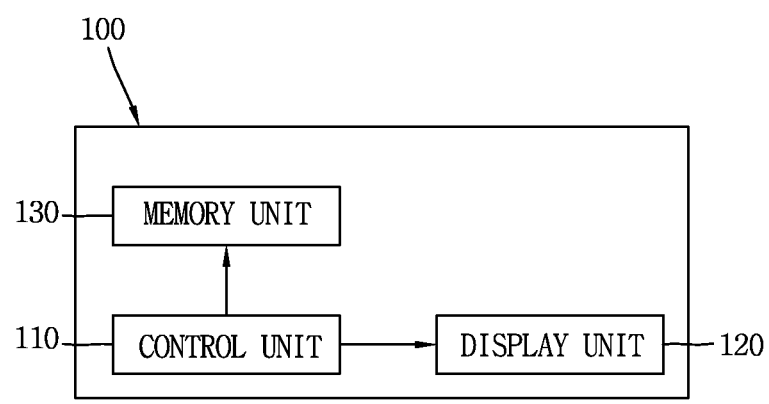
FIG. 1 is a block diagram illustrating a configuration of a terminal according to an embodiment of the present disclosure.

The technology disclosed in this specification may be applied to terminals providing 3D contents. However, the technology disclosed in this specification is not limited thereto, and may be applied to all image display devices, multimedia devices, equipments and control methods thereof, to which the spirit of the technology can be applied.

For example, the technology disclosed in this specification may be applied to various terminals such as a smart phone, a portable terminal, a mobile terminal, a personal digital assistant (PDA), a portable multimedia player (PMP) terminal, a notebook computer, a Wibro terminal, an Internet protocol television (IPTV) terminal, a terminal for digital broadcasting, a telematics terminal, a navigation terminal, an audio video navigation (AVN) terminal, a television, a 3D television, an audio/video (AN) system, a home theater system, an information providing center and a call center.

The 3D contents may include various 3D (or three-dimensional) images (or stereoscopic images) or 3D objects, which generate 3D effects.

Generally, a 3-dimensional stereoscopic image (hereinafter, will be referred to as a 3D image) indicates an image through which a viewer can feel depth and reality of an object disposed on a monitor or a screen as if in the real space.

Specifically, a 3-dimensional (3D) stereoscopic image will be described. Generally, the 3-dimensional stereoscopic image (hereinafter, referred to as the 3D image).

The 3D image may be implemented using binocular disparity. The binocular disparity refers to a parallax obtained by the positions of user's two eyes away from each other. Therefore, when the two eyes see mutually different 2D images and the images are transferred to the brain through retinas and merged, the user may feel the depth and reality of a 3D image.

The 3D image may be displayed using display methods including a stereoscopic method (glass method), an autostereoscopic method (glassless method), a projection method (holographic method), etc. The stereoscopic method is frequently used for home television receivers, etc. and includes a Wheatstone stereoscopic method, etc. The autostereoscopic method is frequently used for mobile terminals, etc. and includes a parallax barrier method, a lenticular method, etc. The projection method includes a reflective holographic method, a transmission type holographic method, etc.

Specifically, the generation and display of a 3D image will be described. Generally, a 3D image includes a left image (left eye image) and a right image (right eye image). The method of merging the left and right images into the 3D image may be classified into a top-down scheme in which the left and right images are disposed up and down in one frame, an L-to-R (left-to-right, side by side) scheme in which the left and right images are disposed left and right in one frame, a checker board scheme in which fragments of the left and right images are disposed in a tile form, an interlaced scheme in which the left and right images are alternately disposed by the column or by the row, a time division (time sequential, frame by frame) scheme in which the left and right images are alternately displayed by the time, etc.

The reason of the generation of the 3D effect for a 3D image or 3D object is that a depth (or depth value) in the 3D image or 3D object exists.

The depth may also be called as disparity.

Specifically, the depth (or depth value) in the 3D image will be described. The depth (or depth value) in the 3D image refers to an indicator indicating the 3D distance between objects within an image. The depth is defined as 256 levels (a maximum value is 255 and a minimum value is 0), and a higher value represents a position closer to a viewer or a user. Therefore, the adjustment of a depth in a 3D image means that the depth of the 3D image is adjusted to its original depth when the 3D image is displayed in an original size and the depth of the 3D image is adjusted to a lower depth than the original depth when a content of the 3D image is displayed as a small image.

For example, in case where the maximum value is 255 and the minimum value is 0 under the assumption that the depth is defined as 256 levels, in the method of controlling the image depth according to the one exemplary embodiment, the depth of a 3D image is adjusted to 255 when the 3D image is displayed in its original size, and the depth of the 3D image is adjusted to a smaller value than 255 when the 3D image is displayed in a smaller size than its original size.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present disclosure.

In the drawings, the thickness of layers, films and regions are exaggerated for clarity. Like numerals refer to like elements throughout.

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

Description will now be given in detail of a rendering method of a 3D web-page and a terminal using the same according to an embodiment, with reference to the accompanying drawings.

FIG. 1 is a block diagram illustrating a configuration of a terminal according to an embodiment of the present disclosure.

Referring to FIG. 1, the terminal 100 according to the embodiment of the present disclosure may include a control unit 110, a display unit 120 and a storage unit 130.

The control unit 110 may provide a general operation of the terminal 100. For example, the control unit 110 may render a 3D web-page implemented through the terminal 100.

Specifically, the control unit 110 may load a source text including depth information on one or more 3D objects constituting the 3D web-page, and create style rules including a document object model (DOM) tree and the depth information by parsing the source text.

The control unit 110 may generate a render tree based on the DOM tree and the style rules, and perform layout on the render tree.

The control unit 110 may paint left-eye and right-eye pages by applying, to the result obtained by performing the layout, a 3D factor including one or more of the position, size, disparity, shape and arrangement of the 3D objects. The control unit 110 may merge the left-eye and right-eye pages under the control of the display unit 120 and display the merged left-eye and right-eye pages on a 3D browser.

The control unit 110 may determine a painting order for the 3D objects or compute the 3D factor through the performance of the layout. Alternatively, the control unit 110 may compute the 3D factor before the painting is performed.

The control unit 110 may compute the 3D factor based on the position (or direction) of the 3D object on the 3D browser or the position of the 3D object in the display unit 120 on which the 3D browser is displayed. The control unit 110 may determine whether or not the 3D object moves. When the 3D object moves, the display unit 120 may perform the layout by re-computing the 3D factor based on a new position of the 3D object on the 3D browser.

The display unit 120 may display (or output) information processed in the terminal 100. For example, when performing a specific function of the terminal 100, the display unit 120 may display a user interface (UI) or graphic user interface (GUI) related to the specific function.

The display unit 120 may display a 3D browser provided by the terminal 100. The display unit 120 may display various 3D contents such as 3D images and 3D objects included in the 3D browser.

The display unit 120 may include at least one of a display unit 141 and a sound output unit 142. The display unit 141 may include at least one of a liquid crystal display (LCD), a thin film transistor-liquid crystal display (TFT LCD), an organic light-emitting diode (OLED), a flexible display, a 3D display and an electronic-ink (e-ink) display.

Some of the displays may be configured as transparent or light-transmissive displays through which a user can see an outside view. These displays may be called as transparent displays, and a transparent OLED (TOLED), etc. may be used as a representative of the transparent displays. The rear structure of the display unit 120 may also be configured as a light-transmissive structure. Through such a structure, the user can see an object positioned at the rear of a body of the terminal 100 through an area occupied by the display unit 120 of the body of the terminal 100.

Various kinds of information may be displayed in the display unit 120. The information may be displayed in the form of a character, number, symbol, graphic, icon, etc., and may be implemented as a 3D stereoscopic image.

The display unit 120 may be operated as the entire area or may be operated by being divided into a plurality of areas. In case of the latter, the plurality of areas may be configured to operate in relation to one another.

For example, output or input windows may be displayed at upper and lower portions of the display unit 120, respectively. Each of the input and output windows may be an area assigned for the output or input of information. Soft keys on which numbers for inputting a telephone number, etc. are displayed may be output on the input window. If a soft key is touched, a number, etc. corresponding to the touched soft key is displayed on the output window. If a manipulating unit is operated, an attempt to connect a call for a telephone number displayed on the output window may be made, or a text displayed on the output window may be input to an application.

The display unit 120 may be configured to receive a touch input by scrolling the display unit 120. The user may move a cursor or pointer positioned on an object, e.g., an icon, etc. displayed on the display unit 120 by scrolling the display unit 120. Further, when a user's finger is moved on the display unit 120, the path along which the user's finger is moved may be visually displayed on the display unit 120. This may be useful in editing images displayed on the display unit 120.

The display unit 120 may include a touch screen. For example, one function of the terminal 100 may be performed, corresponding to a case in which the touch screen of the display unit 120 is touched together with the display unit 120 within a certain range of time. The case in which the touch screen is touched together with the display unit In addition to the case may include a case in which the user clamps the body of the terminal 100 using user's thumb and forefinger. The one function may be, for example, activation or non-activation for the display unit 120.

The storage unit 130 may function to store information processed in the terminal 100.

The storage unit 130 may store a 3D content provided by the terminal 100. Specifically, the storage unit 130 may store 3D images or 3D objects constituting the 3D content, and store depth information on the 3D images or 3D objects, etc.

The storage unit 130 may store a 3D factor for the 3D object processed by the terminal 100, etc.

The storage unit 130 may store various UIs and/or GUIs related to functions performed by the terminal 100.

The storage unit 130 may store data and programs necessary for the operation of the terminal 100.

The storage unit 130 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM) and a programmable read-only memory (PROM).

The terminal 100 may operate a web storage performing a storage function of the storage unit 130 on the Internet or may operate in relation to the web storage.

The components shown in FIG. 1 are not essential, and therefore, the terminal 100 may be implemented to have a larger number of components or to have a smaller number of components.

Figure 2:
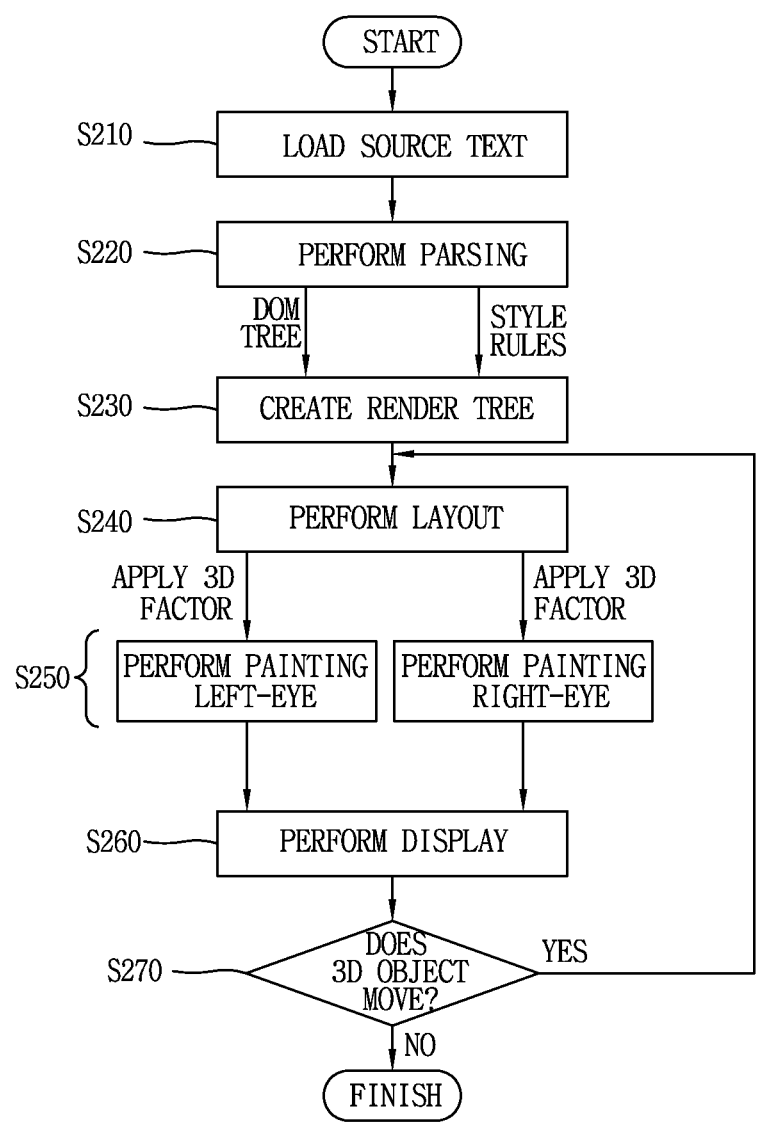
FIG. 2 is a flowchart illustrating a rendering method according to an embodiment of the present disclosure.

FIG. 2 is a flowchart illustrating a rendering method according to an embodiment of the present disclosure.

Referring to FIG. 2, the rendering method of the 3D web-page according to the embodiment of the present disclosure may include the following order.

First, the terminal 100 loads a source text (or source code) for the 3D web-page (S210).

The terminal 100 may receive the source text transmitted from a HTTP module or file system and load the received source text.

The source text may be implemented by various kinds of programming languages. For example, the source text may be implemented by HTML or CSS.

The source text may include depth information on one or more 3D objects constituting the 3D web-page. The source text may include depth information (or depth attribute) on the one or more 3D objects constituting the 3D web-page so that the rendering result of the 3D web-page can have a 3D effect.

The terminal 100 may identify whether or not the source text is previously read data, determine whether or not to open a popup window, or determine whether or not to download a file existing in a web server.

Next, the terminal 100 parses the source text (S220).

The terminal 100 may create a document object model, i.e., DOM tree by parsing the source text. The DOM tree may be called as a content model according to the web engine employed by the terminal.

The terminal 100 may parse the source text using a parser corresponding to the programming language by which the source text is implemented. For example, the terminal 100 may parse the HTML by which the source text is implemented, using an HTML parser. When the source text uses an XML body, the terminal 100 may parse SYG, MathML, etc. in an XML format using an XML parser.

The terminal 100 may create the DOM tree by structuring the source text and representing, as a tree structure, roots and objects constituting the source text, elements, attributes, texts, etc. as a sub-structures.

The terminal 100 may create style rules by parsing the source text.

When the determination of a style is necessary through content sink after the source text is parsed, the terminal 100 may create necessary style sheet and re-perform parsing for determining the style.

The terminal 100 may parse the source text using a parser corresponding to the language by which the source text is implemented. For example, the terminal 100 may parse the CSS by which the source text is implemented, using a CSS parser.

The terminal 100 may parse the depth information on the 3D objects included in the source text and store the parsed depth information in the style rules.

Next, the terminal 100 may generate a render tree (S230).

The terminal 100 may generate the render tree based on the DOM tree and the style rules. The terminal 100 may generate the render tree through attachment or frame construction of the DOM tree and the style rules. The render tree may be called as a frame tree according to the web engine employed by the terminal 100.

The render tree may be generated to include only contents except objects of types, not displayed on the 3D browser in the DOM tree or style rules, e.g., <head>, <title> and <body> tags in the HTML document, a tag in which the value of a "display" property is none in the CSS document, etc.

The render tree may be divided into left-eye and right-eye render trees so as to stereoscopically display the one or more 3D objects included in the 3D web-page.

Next, the terminal 100 performs layout on the render tree (S240).

The terminal 100 may perform the layout for determining the position, size and painting order of various objects constituting the render tree in the 3D web-page. The layout may be called as reflow according to the web engine employed by the terminal 100.

The terminal 100 may determine a painting order for the one or more 3D objects constituting the 3D web-page by performing the layout.

Specifically, the terminal 100 may form one or more layers by incorporating 3D objects having the same depth information among the one or more 3D objects in the same layer, and determine the painting order by arraying the one or more layers based on the depth information. The painting order for the 3D objects may be determined by arraying the one or more layers in an ascending series according to the depth information between the one or more layers.

The painting order may be determined based on a z-index or order indicated in the source text with respect to the 3D objects having the same depth information, which are included in the same layer.

The terminal 100 may compute a 3D factor for the one or more 3D objects by performing the layout. Specifically, the terminal may compute the 3D factor in the performing of the layout, and store the computed 3D factor. Then, the terminal 100 may perform painting by the applying the stored 3D.

The layout process for computing the 3D factor as described above will be described in detail later together with the following embodiments.

Next, the terminal 100 paints the left-eye and right-eye pages (S250).

The painting may be performed by searching the render tree on which the layout is performed and filling RGB values in a specific memory space.

The terminal 100 may paint the left-eye and right-eye pages so as to stereoscopically display the one or more 3D objects constituting the 3D web-page.

The left-eye and right-eye pages are, respectively, input to user's left and right eyes, so that the user can recognize as if the 3D objects included in the left-eye and right-eye pages were stereoscopically floated at the position of a perceived 3D image.

The left-eye and right-eye pages may be painted so that the 3D objects have an arbitrary disparity (or LR shift). The 3D objects may have the disparity based on the result obtained by performing the layout, and the depths of the 3D objects may be adjusted by the disparity. The disparity may be determined by computing the 3D factor.

In the left-eye and right-eye pages, the 3D objects may be painted with red and blue so as to express the 3D effect of the 3D objects using an anaglyph scheme. That is, the 3D object in any one of the left-eye and right-eye pages may be painted with the red, and the 3D object in the other of the left-eye and right-eye pages may be painted with the blue.

When using the 3D browser, the user may wear red and blue glasses, polarized glasses, shutter glasses, etc. so as to view a stereoscopic image using the left-eye and right-eye pages.

The terminal 100 may paint the left-eye and right-eye pages based on the result obtained by performing the layout. For example, may paint the left-eye and right-eye pages based on the painting order determined by the result obtained by performing the layout. The terminal 100 may paint the left-eye and right-eye pages by applying the 3D factor to the result obtained by performing the layout.

The terminal 100 may compute the 3D factor for the one or more 3D objects for the purpose of the painting. Specifically, the terminal 100 may compute the 3D factor before performing the painting, and perform the painting by applying the computed 3D factor.

The painting process for computing the 3D factor as described above will be described in detail later together with the following embodiments.

Finally, the terminal 100 merges the left-eye and right-eye pages and displays the merged left-eye and right-eye pages on the 3D browser (S260).

The terminal 100 may merge the painted left-eye and right-eye pages and simultaneously display the merged left-eye and right-eye pages in one frame of the 3D browser so that the one or more 3D objects can be stereoscopically viewed.

The terminal 100 may display the left-eye and right-eye pages on the 3D browser, according to the merging scheme, using a top-down scheme in which the left and right images are disposed up and down in one frame, an L-to-R (left-to-right, side by side) scheme in which the left and right images are disposed left and right in one frame, a checker board scheme in which fragments of the left and right images are disposed in a tile form, an interlaced scheme in which the left and right images are alternately disposed by the column or by the row or a time division (time sequential, frame by frame) scheme in which the left and right images are alternately displayed by the time.

Additionally, the terminal 100 determines whether or not the 3D object moves (S270).

The movement of the 3D object may be caused by a user's input or re-search of the 3D browser. The movement of the 3D object may be caused by top and bottom/left and right scrolling of the 3D browser, mode conversion of a screen display, or movement of the position of the 3D browser in the display unit 120 on which the 3D browser is displayed.

When the 3D object moves, the terminal 100 re-performs the layout on the render tree for the 3D object (S240).

The terminal 100 may re-perform the layout on the 3D object based on a new position of the 3D object on the 3D browser or a new position of the 3D browser displayed on the display unit 120. The terminal 100 may re-compute the 3D factor as occasion demands, and apply the re-computed 3D factor to the result obtained by re-performing the layout.

Hereinafter, some embodiments of the method of computing 3D factor will be described in detail.

Figure 3:
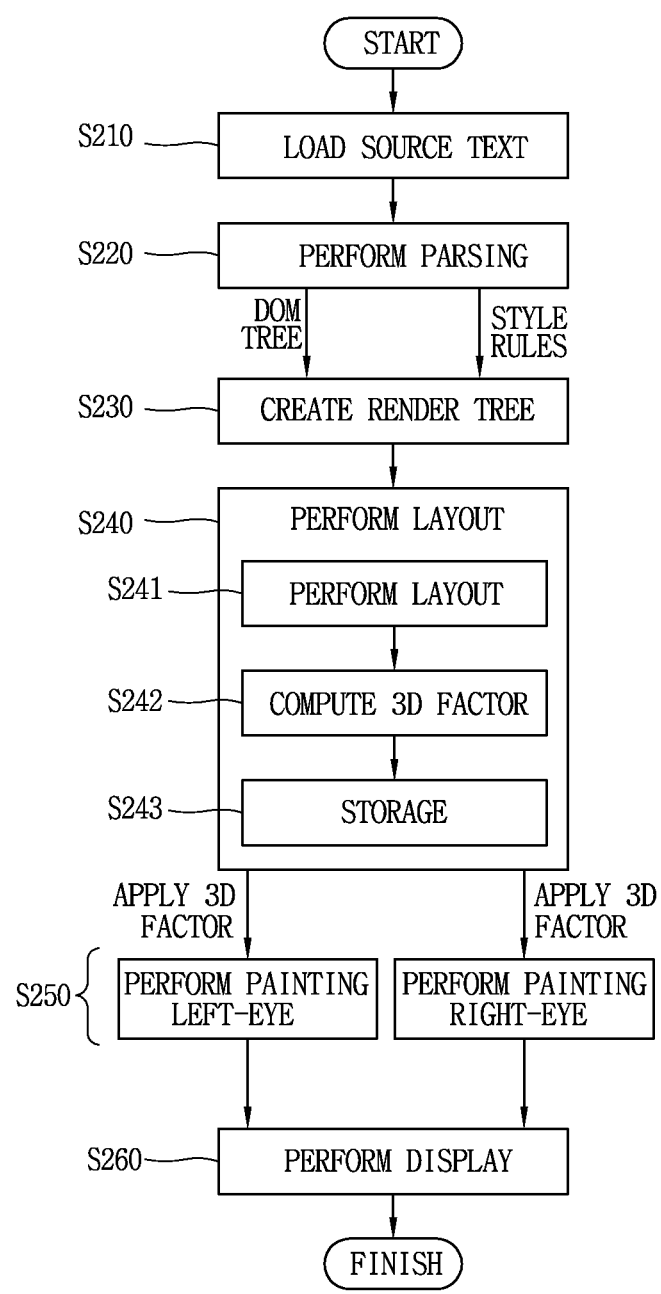
FIG. 3 is a flowchart illustrating an example of a layout process according to an embodiment of the present disclosure.

FIG. 3 is a flowchart illustrating an example of a layout process according to an embodiment of the present disclosure.

Referring to FIG. 3, the layout process according to the embodiment of the present disclosure may include the following order.

First, the terminal 100 performs layout on a render tree (S241).

The terminal 100 may perform the layout for determining the position, size and painting order of various objects constituting the render tree in the 3D web-page.

The terminal 100 may determine a painting order for the one or more 3D objects constituting the 3D web-page by performing the layout. The determining of the painting order is a separate process from the layout, and may be performed on only the 3D objects.

Next, the terminal 100 computes a 3D factor (S242).

The 3D factor may include one or more of the size, display position, disparity, shape and arrangement of the 3D factor.

The terminal 100 may compute the 3D factor based on depth information on the one or more 3D objects included in the render tree. For example, the terminal may compute the size of the 3D object as a large value in proportion to a positive increase in depth information on the 3D object, and compute the size of the 3D object as a small value in proportion to a negative increase in the depth information on the 3D object. Alternatively, the terminal 100 may compute the shape of the 3D object to be concave or convex according to the depth information. Alternatively, the terminal 100 may allow the 3D object to be viewed as a protruded or recessed 3D object by computing the disparity of the 3D object according to the depth information.

The terminal 100 may compute one or more of the size and position of the 3D object based on the position of the 3D object on the 3D browser or the position of the 3D object in the display unit 120 on which the 3D browser is displayed. For example, the terminal 100 may compute the size of the 3D object to be larger or smaller than the value in proportion to the depth information, as the 3D object is close to or distant from a specific position of the 3D browser or the display unit 120. Alternatively, when the 3D object is positioned in an arbitrary direction with respect to the specific position of the 3D browser or the display unit 120, the terminal 100 may compute the position of the 3D object as a position obtained by further moving the position of the 3D object by an arbitrary distance in the arbitrary direction. Alternatively, when the 3D object is close to or distant from the specific position of the 3D browser or the display unit 120 or when the 3D object is positioned in the arbitrary direction with the specific position of the 3D browser or the display unit 120, the terminal 100 may change the shape of the 3D object to be distorted, symmetric, rotated or lengthened. Alternatively, the terminal 100 may allow the 3D object to be viewed as a protruded or recessed by computing the disparity of the 3D object based on the position of the 3D object.

Here, the specific position may be a position of the user's sight, and the position of the user's sight may be a center of the 3D browser or a center of the display unit 120 on which the 3D browser is displayed.

When the terminal 100 is separately provided with a sight sensing unit capable of sensing the position of the user's sight, the terminal 100 may compute the 3D factor by determining the position of the user's sight, sensed through the sight sensing unit, as the specific position.

Finally, the terminal 100 stores the 3D factor (S243).

The terminal 100 may store the calculated 3D factor together with layout information of the 3D web-page or may separately store the 3D factor. The stored 3D factor may be applied when the left-eye and right-eye pages are painted.

The computation and storage of the 3D factor may be performed before the layout of the render tree or may be simultaneously performed together with the layout of the render tree.

Figure 4:
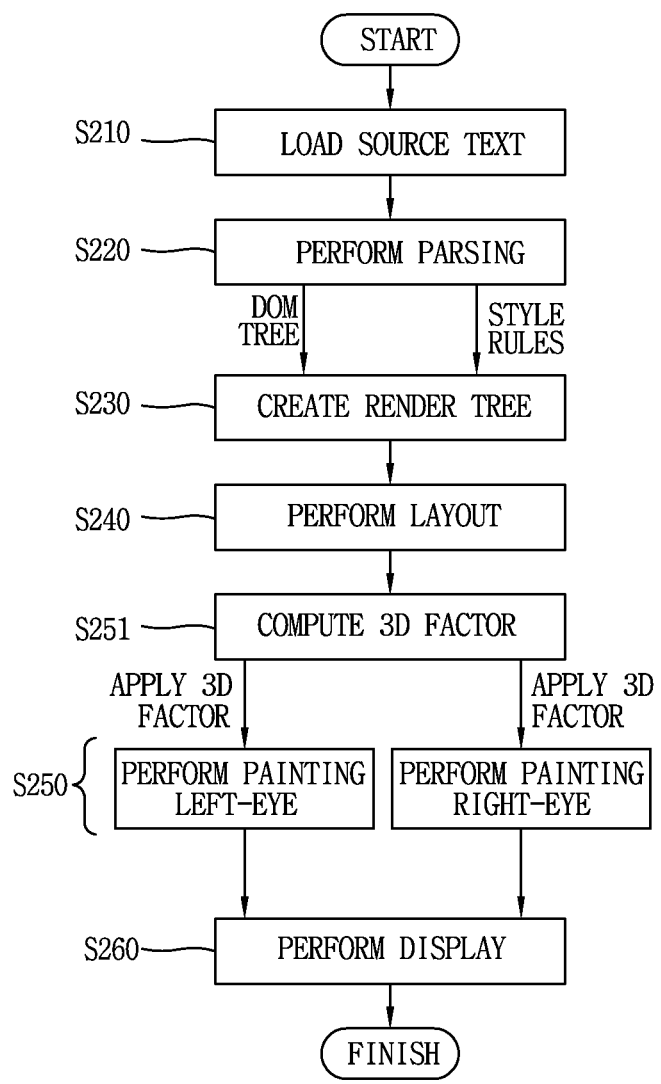
FIG. 4 is a flowchart illustrating an example of a painting process according to an embodiment of the present disclosure.

FIG. 4 is a flowchart illustrating an example of a painting process according to an embodiment of the present disclosure.

Referring to FIG. 4, the paining process according to the embodiment of the present disclosure may include the following order.

First, the terminal 100 perform layout on a render tree (S240).

The terminal 100 may perform the layout for determining the position, size and painting order of various objects constituting the render tree in the 3D web-page.

The terminal 100 may determine a painting order for the one or more 3D objects constituting the 3D web-page by performing the layout.

Next, the terminal 100 computes a 3D factor (S251).

The terminal 100 may compute the 3D factor so as to paint left-eye and right-eye pages.

Detailed descriptions according to the computation of the 3D factor are the same as those in the embodiment described with reference to FIG. 3.

Finally, the terminal 100 paints the left-eye and right-eye pages (S250).

The terminal 100 may paint the left-eye and right-eye pages by applying the 3D factor to the result obtained by performing the layout.

FIG. 5 is a view illustrating a result displayed on a 3D web-page according to a first embodiment of the present disclosure.

Referring to FIG. 5, the terminal 100 may render the 3D web-page according to the embodiment of the present disclosure so as to display the one or more 3D objects having the depth information among various objects constituting the 3D web-page.

As shown in FIG. 5, the 3D objects may be stereoscopically displayed by displaying the left-eye and right-eye pages in one frame through the rendering.

For example, when the depth information of the 3D object has a positive value, the terminal 100 may compute the size information among the 3D factor for the 3D object to be larger than the size corresponding to the depth information. The terminal 100 may adjust the disparity of the 3D object so that the 3D object is viewed as a protruded 3D object, or may control the shape of the 3D object to be viewed as a convex 3D object.

On the contrary, when the depth information of the 3D object has a negative value, the terminal 100 may compute the size information among the 3D factor for the 3D object to be smaller than the size corresponding to the depth information. The terminal 100 may adjust the disparity of the 3D object so that the 3D object is viewed as a recessed 3D object, or may control the shape of the 3D object to be viewed as a concave 3D object.

For example, the terminal 100 may compute the size of the 3D object to be larger than the value in proportion to the depth information as the 3D object is closer to a specific position of the 3D browser. Alternatively, the terminal may adjust the disparity of the 3D object so that the 3D object is viewed as a protruded 3D object, or may control the shape of the 3D object to be viewed as a convex 3D object.

On the contrary, the terminal 100 may compute the size of the 3D object to be smaller than the value in proportion to the depth information as the 3D object is closer to a specific position of the 3D browser. Alternatively, the terminal may adjust the disparity of the 3D object so that the 3D object is viewed as a recessed 3D object, or may control the shape of the 3D object to be viewed as a concave 3D object.

Here, the specific position may be a position of the user's sight. The position of the user's sight may be a center of the 3D browser or a center of the display unit 120 on which the 3D browser is displayed.

When the terminal 100 is separately provided with a sight sensing unit capable of sensing the position of the user's sight, the terminal 100 may compute the 3D factor by determining the position of the user's sight, sensed through the sight sensing unit, as the specific position.

Figure 6:
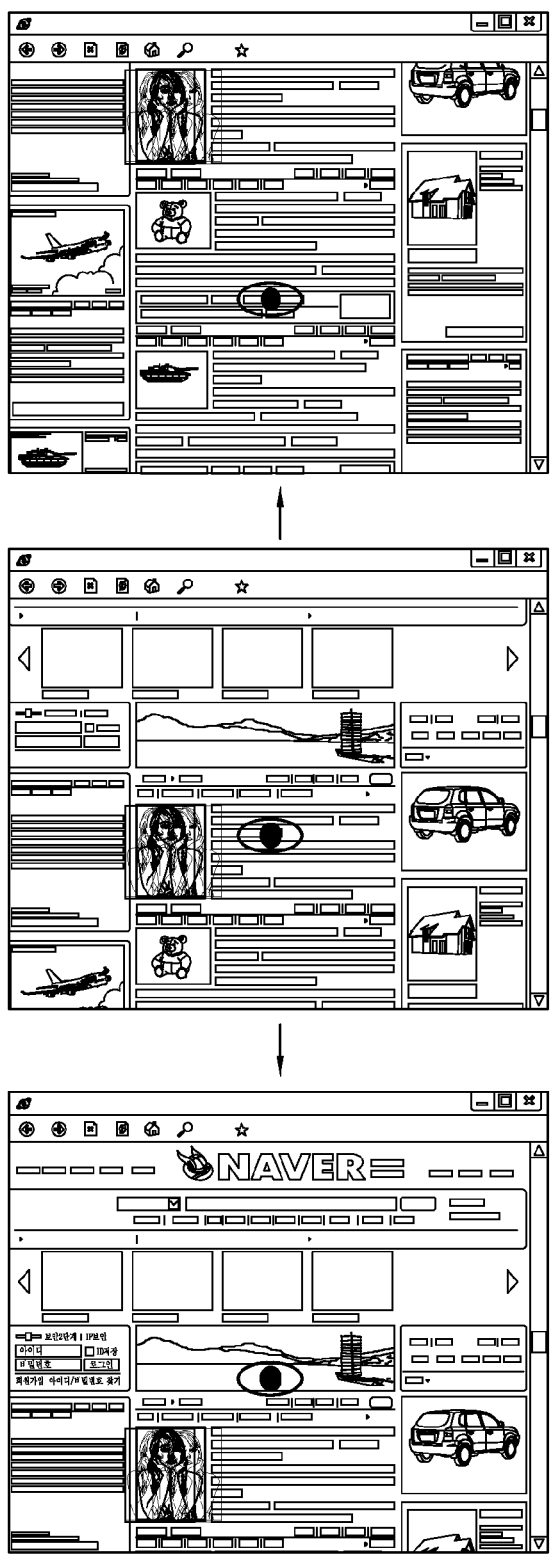
FIG. 6 is a view illustrating a result displayed on a 3D web-page according to a second embodiment of the present disclosure.

FIG. 6 is a view illustrating a result displayed on a 3D web-page according to a second embodiment of the present disclosure.

Referring to FIG. 6, when the 3D object is positioned in an arbitrary direction with respect to the specific position of the 3D browser, the terminal 100 may compute the position of the 3D object as a position obtained by further moving the position of the 3D object by an arbitrary distance in the arbitrary direction.

Here, the specific position may be a position of the user's sight, and the position of the user's sight may be a center of the 3D browser or a center of the display unit 120 on which the 3D browser is displayed.

When the terminal 100 is separately provided with a sight sensing unit capable of sensing the position of the user's sight, the terminal 100 may compute the 3D factor by determining the position of the user's sight, sensed through the sight sensing unit, as the specific position.

The arbitrary direction may be changed by top and bottom/left and right scrolling of the 3D browser, caused by a user's input or re-search of the 3D web browser, mode conversion of a screen display, or movement of the position of the 3D browser in the display unit 120 on which the 3D browser is displayed.

For example, when the 3D object is positioned in a lower direction with respect to the center of the 3D browser by a user's scroll-up input, the terminal 100 may determined the display position of the 3D object as a lower position so that the position of the 3D object is viewed lower by an arbitrary distance than the original position of the 3D object. The terminal 100 may compute the 3D factor so that the size of the 3D object is viewed to be decreased or that the 3D object is displayed in a compressed, rotated or symmetric shape.

On the contrary, when the 3D object is positioned in an upper direction with respect to the center of the 3D browser by a user's scroll-down input, the terminal 100 may determined the display position of the 3D object as an upper position so that the position of the 3D object is viewed upper by an arbitrary distance than the original position of the 3D object. The terminal 100 may compute the 3D factor so that the size of the 3D object is viewed to be decreased or that the 3D object is displayed in a compressed, rotated or symmetric shape.

For example, when the display position of the 3D object is further moved by the arbitrary distance in the arbitrary direction, the terminal 100 may compute the display position of the 3D object based on the depth information.

For example, the terminal 100 may determine the display position of the 3D object by increasing the movement range of the display position in proportion to the positive increase of the depth information. This is because the size of an object positioned close is larger than that of an object positioned distant. To allow the 3D object to exist relatively close, the terminal 100 may determine the display position of the 3D object by increasing the movement range of the 3D object of which depth information is large as a positive value.

FIG. 7 is a view illustrating a result displayed on a 3D web-page according to a third embodiment of the present disclosure.

Referring to FIG. 7, the terminal 100 may compute the 3D factor based on the position of the 3D browser on the display unit 120 on which the 3D browser is displayed.

When the 3D browser is not in a whole screen mode but is in a window screen mode, the position of the 3D browser may be changed by the top and bottom/left and right movement of the 3D browser through a user's input, etc.

The terminal 100 may compute one or more of the size and position of the 3D object based on the position of the 3D browser with respect to a specific position.

Here, the specific position may be a position of the user's sight, and the position of the user's sight may be a center of the 3D browser or a center of the display unit 120 on which the 3D browser is displayed.

When the terminal 100 is separately provided with a sight sensing unit capable of sensing the position of the user's sight, the terminal 100 may compute the 3D factor by determining the position of the user's sight, sensed through the sight sensing unit, as the specific position.

For example, when the 3D browser is positioned at a top/bottom side and/or a left/right side with respect to the center of the display unit 120 through the user's input, the terminal 100 may compute the 3D factor so that the size of the 3D factor is decreased, that the display position of the 3D object is further moved to the top side and/or the left side, or that the shape of the 3D object is changed.

Figure 8:
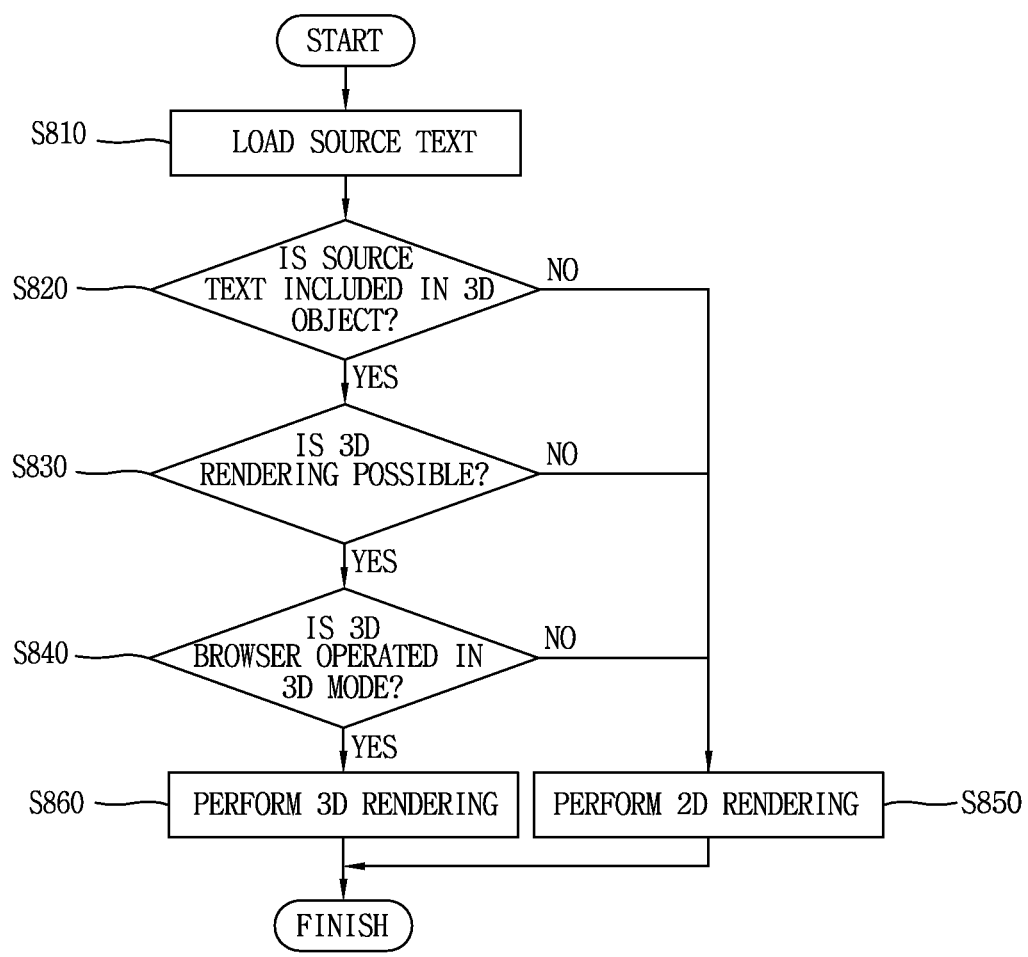
FIG. 8 is a flowchart illustrating an operating process of a 3D browser using the rendering method according to an embodiment of the present disclosure.

FIG. 8 is a flowchart illustrating an operating process of a 3D browser using the rendering method according to an embodiment of the present disclosure.

Referring to FIG. 8, the operating process of the 3D browser using the rendering method according to the embodiment of the present invention may be performed in the following order.

First, the terminal 100 loads a source text (S810).

The terminal 100 may receive the source text transmitted from a HTTP module or file system and load the received source text. The source text may be implemented by various kinds of programming languages. For example, the source text may be implemented by HTML or CSS.

Next, the terminal 100 determine whether or not the source text includes a 3D object (S820).

For example, the terminal 100 may determine that the source text includes the 3D object in the following cases;
- a case in which the source text includes 3D information such as depth information on one or more 3D objects,
- a case in which the source text includes an object such as video/audio that can be three-dimensionally expressed (e.g., a case in which the object is clearly stated as a 3D object using a mime-type source text or HTML source text),
- a case in which the source text includes information allowing the rendering to be three-dimensionally performed (e.g., a case in which the source text includes information such as html 3d="true" in the HTML source text), and
- all cases in which it is necessary to rendering the 3D object.

When the source text does not include the 3D object, the terminal 100 may perform 2D rendering on the source text.

When the source text includes the 3D object, the terminal 100 determines whether or not to render the 3D object (S830).

The terminal 100 may determine whether or not to support a 3D operation and to render the 3D object.

When the terminal 100 does not support the 3D operation, the terminal performs 2D rendering on the source text (S850).

The terminal 100 may provide the user with a notification for informing the user that the terminal 100 does not support the 3D operation. The notification may be provided in the form of an icon, favicon, status bar, etc.

When the 3D rendering is possible to be performed by adding a device capable of supporting the 3D operation or installing plug-in, Active-X, application program, driver, etc., the terminal 100 may continuously perform a subsequent operation or inform the user of the subsequent operation.

When the terminal 100 supports the 3D operation, the terminal 100 determines whether or not the 3D browser is operated in a 3D mode (S840).

The 3D browser may configure or change a rendering mode for determining the rendering method of the 3D browser through a user's input or requirement.

When the 3D browser is not operated in the 3D mode, i.e., when the 3D browser is operated in a 2D mode, the terminal 100 performs 2D rendering on the source text (S850).

The terminal 100 may provide the user with the notification for informing the user that the 3D browser is not operated in the 3D mode. The notification may be provided in the form of an icon, favicon, status bar, etc. Alternatively, the terminal 100 may advise the user to change the 3D browser to be operated in the 3D mode or may inquire the user's intension.

The terminal 100 may control the 3D browser to be operated in the 3D mode. The terminal 100 may control the 3D browser to be operated in the 3D mode by configuring or changing the rendering mode of the 3D browser into the 3D mode.

When the 3D browser is operated in the 3D mode, the terminal 100 performs 3D rendering on the source text (S860).

The terminal 100 may perform the 3D rendering on the source text using the rendering method according to the embodiments of the present disclosure.

The scope of the present disclosure is not limited to the embodiments disclosed in this specification, and it will be understood by those skilled in the art that various changes and modifications can be made thereto within the technical spirit and scope defined by the appended claims.

The invention claimed is:

1. A rendering method of a 3-dimensional (3D) web-page including at least one 3D object at a mobile terminal comprising a controller coupled with a display and a memory, the method performed by the controller and comprising:
    loading a source text including depth information on the at least one 3D object;
    creating a document object model (DOM) tree and style rules including the depth information by parsing the source text;
    generating a render tree based on the DOM tree and the style rules;
    performing a layout on the render tree to determine a position, a size and a painting order of the at least one 3D object;
    computing a 3D factor including at least one of the position, the size, a disparity, a shape, or an arrangement of the at least one 3D object based on the depth information;
    painting left-eye and right-eye pages by applying the computed 3D factor to a result obtained by performing the layout; and
    merging the left-eye and right-eye pages and causing the display to display the merged left-eye and right-eye pages on a 3D browser,
    wherein when the at least one 3D object is positioned in an arbitrary direction with respect to a specific position of the 3D browser, the 3D factor is computed by moving the at least one 3D object by an arbitrary distance in the arbitrary direction.

2. The method of claim 1, wherein the at least one 3D object comprises a plurality of 3D objects having different depth information, and the performing of the layout comprises:
    forming layers by incorporating 3D objects having same depth information among the plurality of 3D objects in a same layer; and
    determining a painting order by arraying the layers based on the depth information.

3. The method of claim 2, wherein the painting order is determined based on a z-index or order indicated in the source text with respect to the 3D objects having the same depth information and included in the same layer.

4. The method of claim 1, wherein the performing of the layout comprises storing the 3D factor in the memory.

5. The method of claim 1, wherein the 3D factor is computed such that:
    a size of the at least one 3D object becomes greater than an original size of the at least one 3D object in proportion to deepening of the depth information; and
    the size of the at least one 3D object becomes less than the original size of the at least one 3D object in proportion to shallowing of the depth information.

6. The method of claim 1, wherein the 3D factor is computed based on the position of the at least one 3D object on the 3D browser.

7. The method of claim 1, wherein the 3D factor is computed such that:
    a size of the at least one 3D object becomes greater in value in proportion to the depth information as the position of the at least one 3D object gets closer to a specific position of the 3D browser; and the size of the at least one 3D object becomes less in value in proportion to the depth information as the position of the at least one 3D object gets farther from the specific position of the 3D browser.

8. The method of claim 7, wherein the specific position is a center of the 3D browser.

9. The method of claim 1, wherein the 3D factor is computed based on a position of the 3D browser on the display on which the 3D browser is displayed.

10. The method of claim 1, further comprising:
determining whether or not the at least one 3D object moves; and
performing the layout by re-computing the 3D factor based on a new position of the at least one 3D object on the 3D browser when the 3D object moves.

11. A terminal comprising:
a controller configured to render a 3-dimensional (3D) web-page including at least one 3D object;
a memory operably coupled to the controller; and
a display operably coupled to the controller and configured to display the rendered 3D web-page,
wherein the controller is configured to:
load a source text including depth information on the at least one 3D object;
create a document object model (DOM) tree and style rules including the depth information by parsing the source text;
generate a render tree based on the DOM tree and the style rules;
perform layout on the render tree to determine a position, a size and a painting order of the at least one 3D object;
compute a 3D factor including at least one of the position, the size, a disparity, a shape and an arrangement of the at least one 3D object based on the depth information;
paint left-eye and right-eye pages by applying the computed 3D factor to a result obtained by performing the layout; and
cause the display to merge the left-eye and right-eye pages and to display the merged left-eye and right-eye pages on a 3D browser,
wherein when the at least one 3D object is positioned in an arbitrary direction with respect to a specific position of the 3D browser, the controller is further configured to compute the 3D factor by moving the at least one 3D object by an arbitrary distance in the arbitrary direction.

12. The terminal of claim 11, wherein the at least one 3D object comprises a plurality of 3D objects having different depth information, and the controller is further configured to:
form layers by incorporating 3D objects having same depth information among the plurality of 3D objects in a same layer; and
determine a painting order by arraying the layers based on the depth information.

13. The terminal of claim 12, wherein the controller is further configured to determine the painting order based on a z-index or order indicated in the source text with respect to the 3D objects having the same depth information and included in the same layer.

14. The terminal of claim 11, wherein the controller is further configured to cause the memory to store the 3D factor.

15. The terminal of claim 11, wherein the 3D factor is computed based on the position of the at least one 3D object on the 3D browser.

16. The terminal of claim 11, wherein the 3D factor is computed based on a position of the 3D browser on the display.

* * * * *